(12) United States Patent
Elmore (10) Patent No.: US 10,375,871 B1
(45) Date of Patent: Aug. 13, 2019

(54) DALLISGRASSWEEDER A WEED SURGEON (71) Applicant: Addis Paul Elmore, Carrollton, TX (US)

(72) Inventor: Addis Paul Elmore, Carrollton, TX (US)

( * ) Notice: Subject to any disclaimer, the term of this patent is extended or adjusted under 35 U.S.C. 154(b) by 0 days.

(21) Appl. No.: 15/979,780

(22) Filed: May 15, 2018

(51) Int. Cl.
*A01B 1/16* (2006.01)

(52) U.S. Cl.
CPC .................... *A01B 1/16* (2013.01)

(58) Field of Classification Search
CPC ............. A01B 1/00; A01B 1/06; A01B 1/18
USPC ................. 254/19, 29, 131.5, 131, 132
See application file for complete search history.

(56) References Cited

U.S. PATENT DOCUMENTS

| | | | | |
|---|---|---|---|---|
| 4,832,132 A * | 5/1989 | Barcelon | ............ | A01B 1/16 172/371 |
| 5,005,888 A * | 4/1991 | Parks | ............ | A01B 1/16 294/50 |
| 5,193,871 A * | 3/1993 | Williams | ............ | A01B 1/16 294/50 |
| 6,662,879 B1 * | 12/2003 | Costa | ............ | A01C 5/02 172/22 |
| 6,739,401 B1 * | 5/2004 | Soya | ............ | A01B 1/24 111/106 |
| 7,117,954 B2 * | 10/2006 | Vipond | ............ | A01B 1/16 172/378 |

* cited by examiner

*Primary Examiner* — Monica S Carter
*Assistant Examiner* — Makena S Markman (57) ABSTRACT

A powerful very strong commercial grade hand operated tool for removing weeds intact from a standing position. The tool includes cushions on the handles that are firm and pleasant to use and are replaceable. There are bolts contained in the retaining device that are also replaceable. A completely serviceable tool. There is an ejector disc contained within the retaining device on the bottom end used to expel the weed debris from the tool into a refuse container, this action is spring loaded from the top end of the tool.

3 Claims, 10 Drawing Sheets

Figure 2

Figure 3   View from the ground looking up

Figure 5

Figure 6  Clockwise Rotation

Figure 7  View from the ground up

Figure 10:
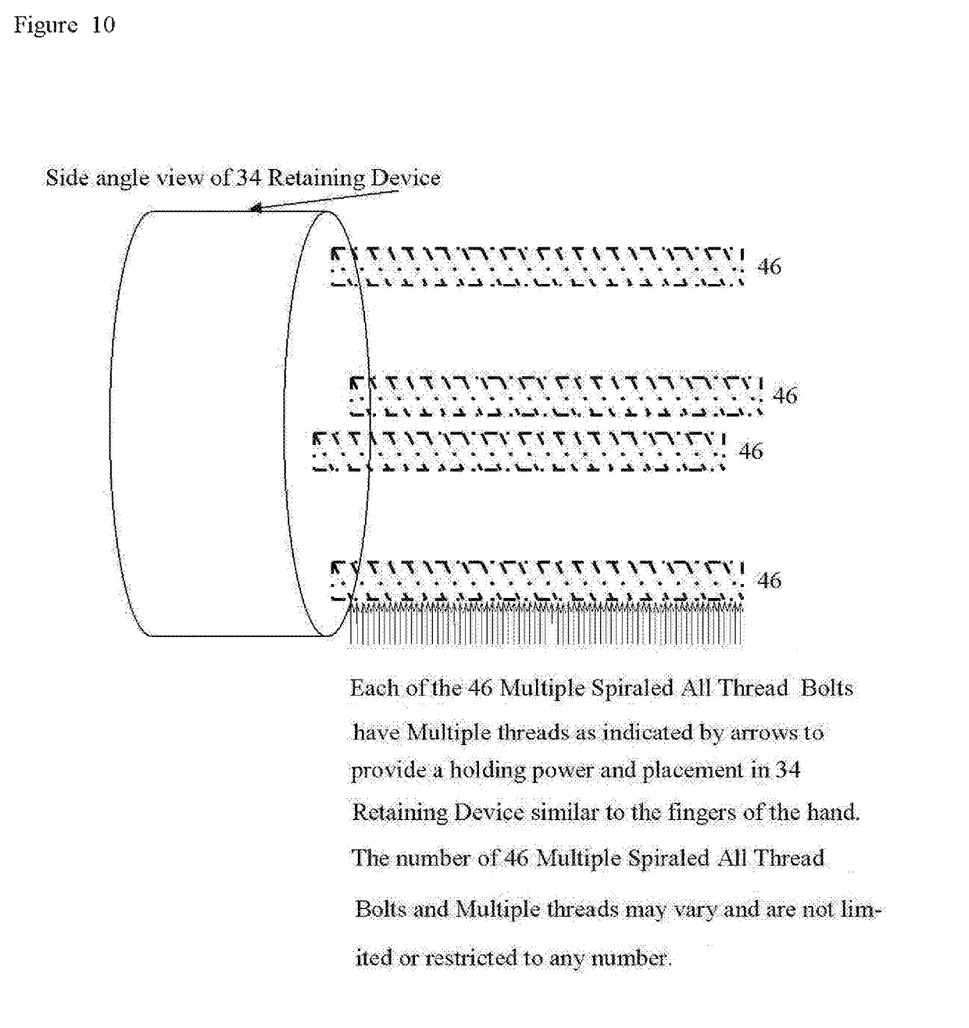
FIG. 10 is a side angle view of the retaining device and the each of the multiple spiraled all thread bolts have multiple threads as indicated by arrows to provide a holding power and placement in the retaining device very similar to the fingers of the human hand. The number of multiple spiraled all thread bolts and multiple threads may vary and are not limited or restricted to any number.

Each of the 46 Multiple Spiraled All Thread Bolts have Multiple threads as indicated by arrows to provide a holding power and placement in 34 Retaining Device similar to the fingers of the hand. The number of 46 Multiple Spiraled All Thread Bolts and Multiple threads may vary and are not limited or restricted to any number.

DALLISGRASSWEEDER A WEED SURGEON

BACKGROUND OF THE INVENTION

Field of Invention

The present Invention relates generally to a weed tool. More specifically, the invention relates to a tool that surgically removes weeds intact.

Related Art

It is unfortunate but all too common heretofore, tool devices for dealing with weeds have sharp points, sharp blades, and cut, break, and or mutilate the stems containing seed, and rhizomes leaving and scattering the weeds seed to germinate wherever they lay.

It is especially problematic to leave perennial rhizomes and seeds in or on the ground.

Presently there is no solution for dealing with weeds and keeping them intact while removing them.

Chemicals capable of killing weeds to date will kill other desirable plants around the weed, even some of the soil, and then the rain and or sprinkler system run off drains to our creeks, streams, rivers, and lakes leaching into the drinking water system.

Chemicals to date only seem to slow down at best the weed that simply returns.

Accordingly, there exists a need for a method and apparatus for removing weeds intact and without chemicals being involved.

Presidential Executive Order 13112 of Feb. 3, 1999 places the "dallis grass weed" and or "*Paspalum Dilatatum*" on an undesirable list of an "Invasive Species". Thus a most desirable name for this tool is "dallisgrassweeder" and or "weed surgeon" because of the unlimited types of weeds it will surgically remove.

SUMMARY OF THE INVENTION AND ADVANTAGES

The subject invention comprises a method and apparatus relating to a tool that can and does surgically remove weeds, precisely targeting rhizomes, roots, stems, and seed including the most hideous dallis grass weed with its rhizomes, roots, and stems, containing seed from the ground. A scientific name for Dallis grass is "*Paspalum Dilatatum*" and is a species of grass known by the common names dallis grass, sticky heads, or other names depending on the reference material. It may grow upwards of five feet tall with seeds on the end of the stems and have a base of rhizomes, roots, stems, and seeds.

Dallis grass is known throughout the world as an introduced species and mostly known as a weed. Its rapid growth, spreading rhizomes, roots, and stems containing seed make it an invasive pest in lawns. However, it will be appreciated that the invention is equally applicable to any weed and shall surgically remove any weed.

It is present in the southern half of North America, southern Europe, much of Africa, Australia, New Zealand, and many tropical and subtropical areas.

BRIEF DESCRIPTION OF THE DRAWINGS

These and other features and advantages of the present invention will become more readily appreciated, as the same becomes better understood by reference to the following detailed description when considered in connection with the accompanying drawings, wherein.

DETAILED DESCRIPTION OF THE PREFERRED EMBODIMENT

Figure 1:
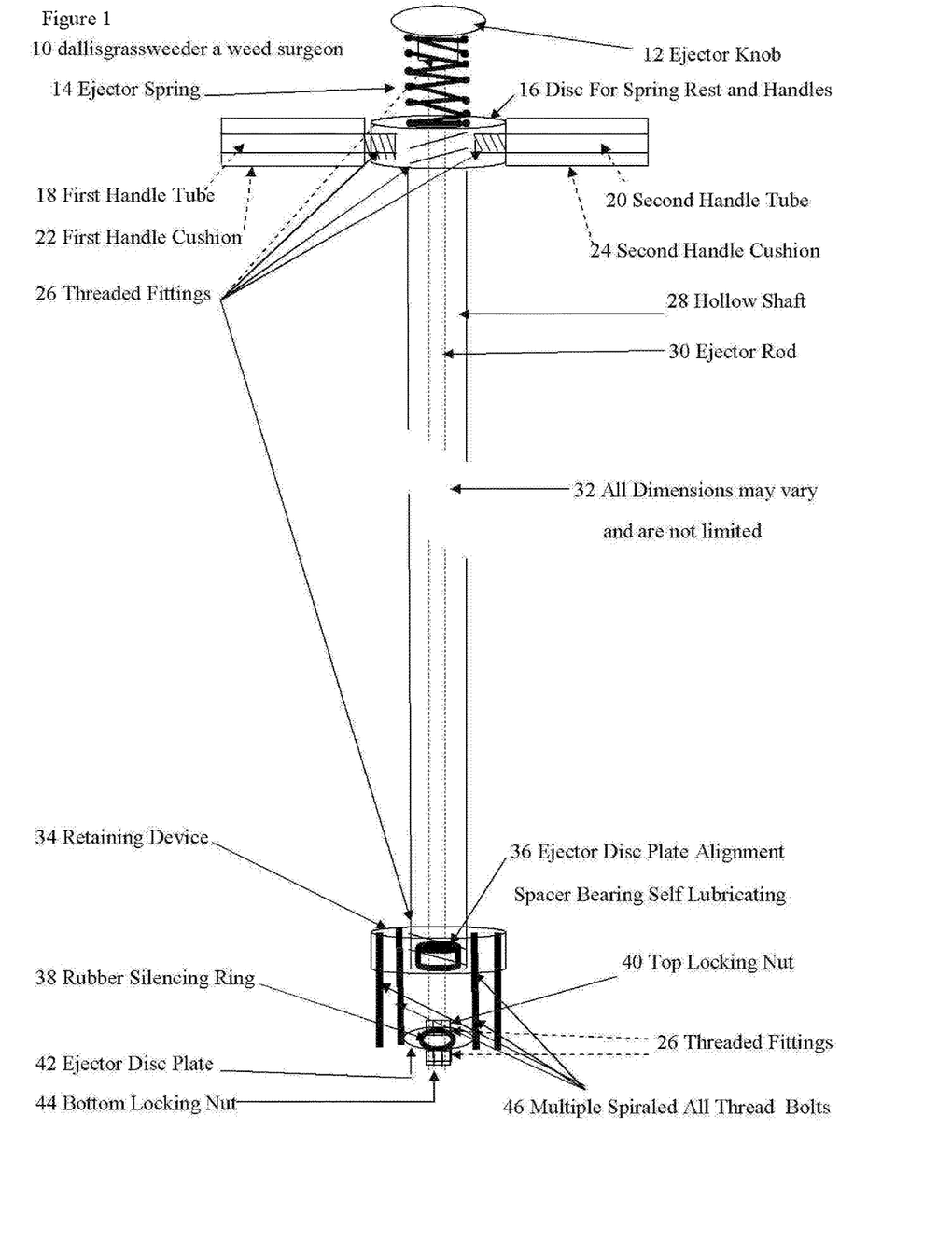
FIG. 1 is a view showing a "dallisgrassweeder a weed surgeon" comprising all the parts in one Figure.
Figure 2:
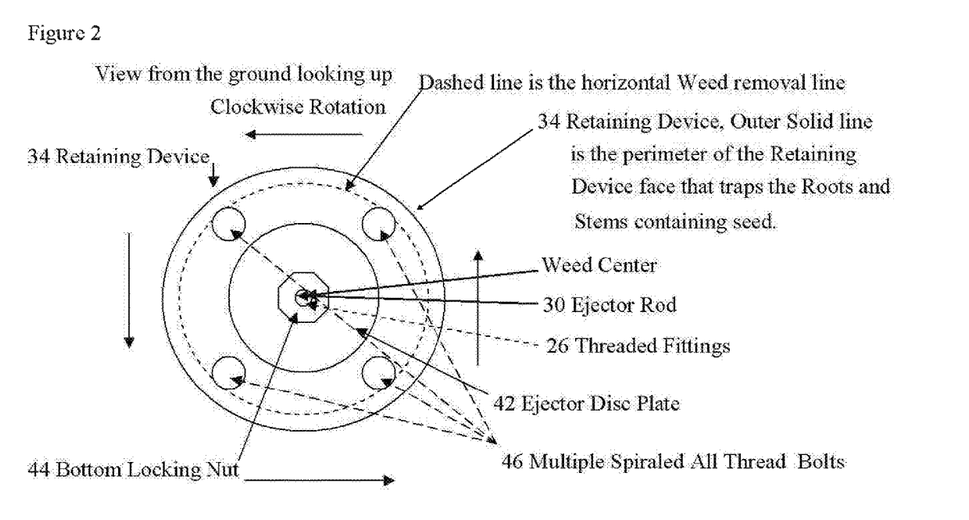
FIG. 2 is a closer view of the retaining device, the blunt or otherwise flat ends of the spiraled all thread bolts, the tool and weed center, the ejector rod, threaded fittings, the ejector disc plate 42, rubber silencing ring 38, an ejector disc olate alignment spacer bearing 36, a top locking nut 40 and the bottom locking nut 44.
Figure 3:
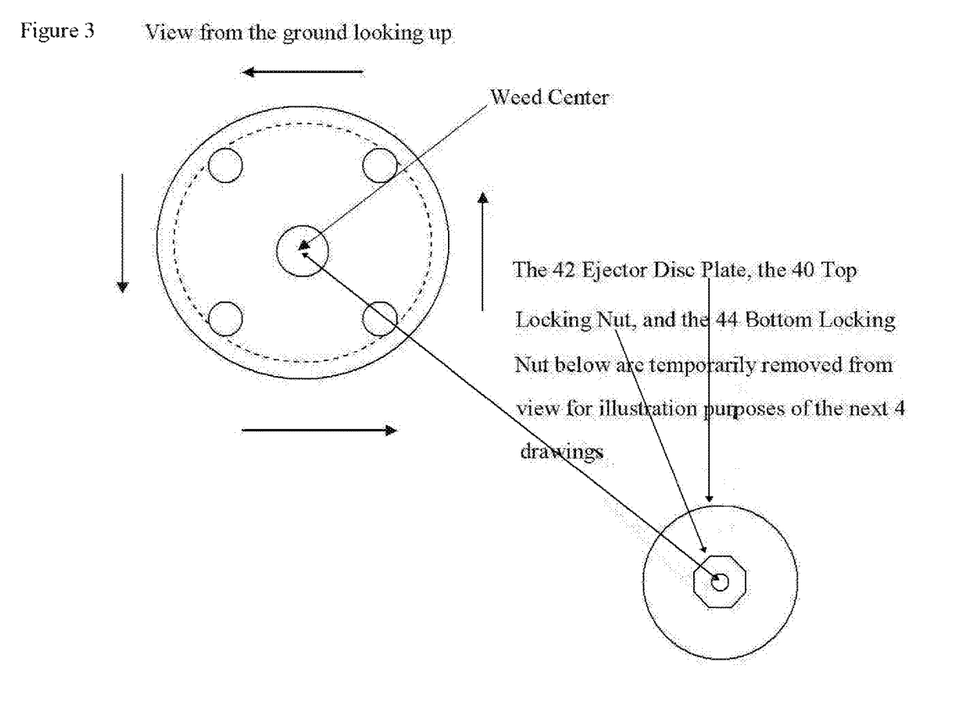
FIG. 3 is a closer view of the retaining device with the ejector disc plate and nut moved to the side for illustration purposes for the following four drawings in FIGS. 4, 5, 6, and 7.
Figure 4:
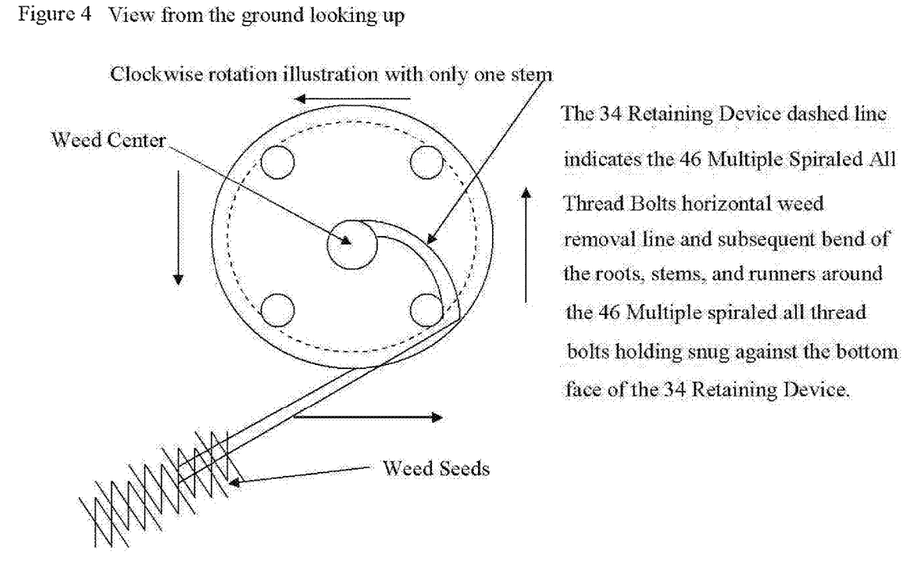
FIG. 4 is a view of only one grass stem horizontally rolling up on the retaining device. There is no limit to the number of grass stems to be rolled up
Figure 5:
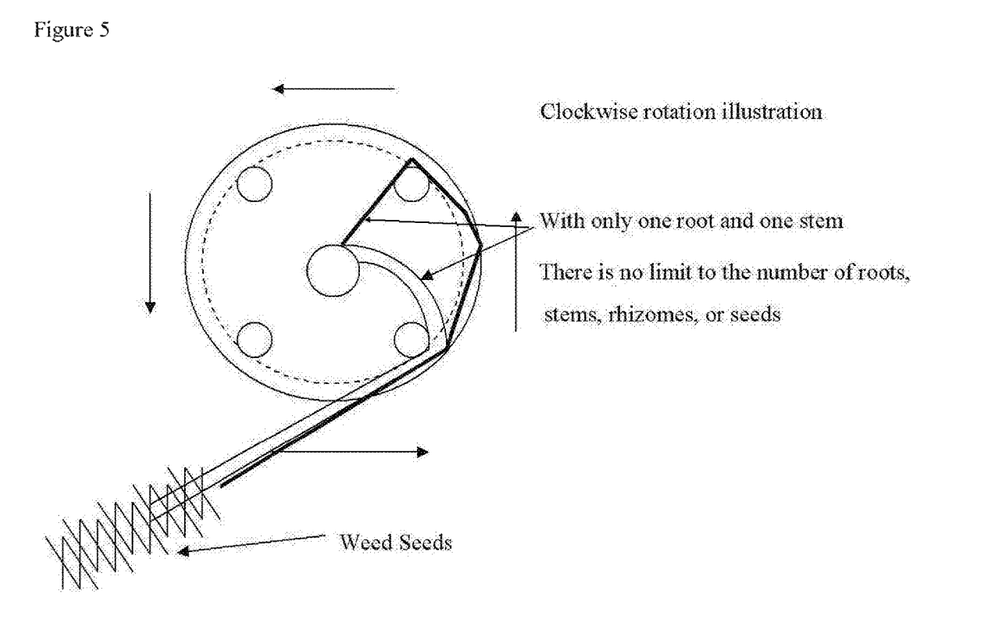
FIG. 5 is a view of one root and one grass stem horizontally rolling up on the retaining device. There is no limit to the number of roots and or grass stems to be rolled up
Figure 6:
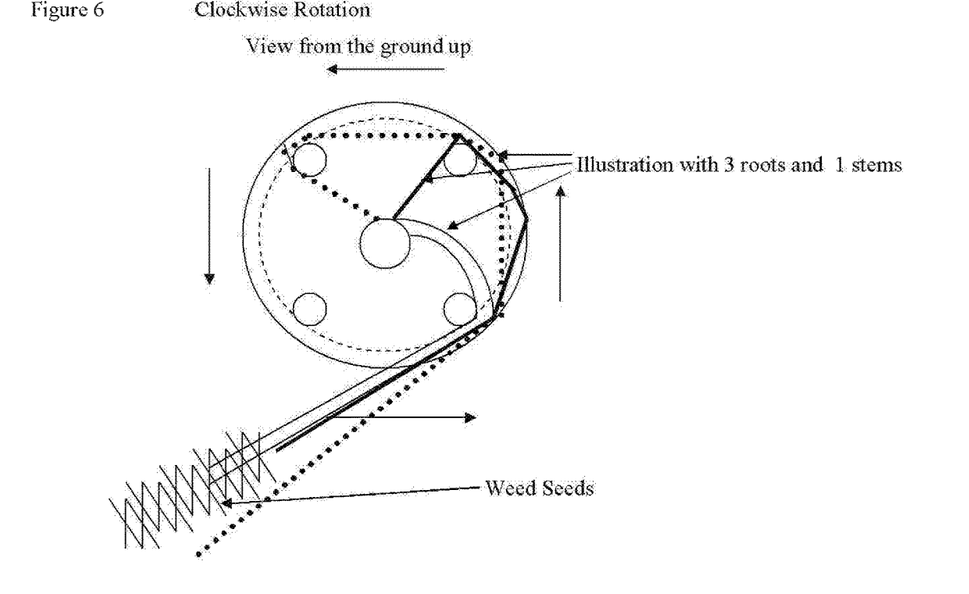
FIG. 6 is a view of three roots and one grass stem horizontally rolling up on the retaining device. There is no limit to the number of roots and or grass stems to be rolled up
Figure 7:
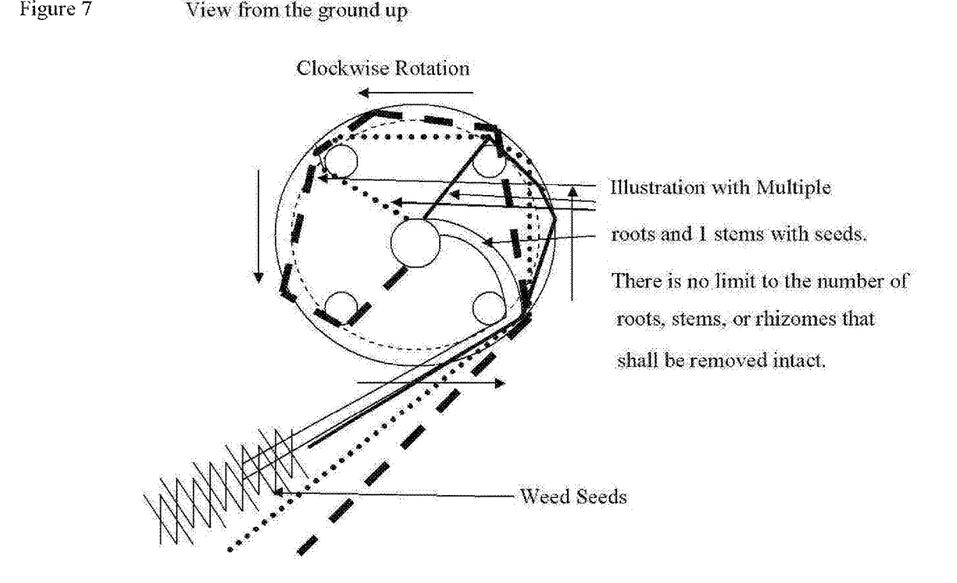
FIG. 7 is a view of multiple roots and 1 grass stem and there is no limit to the number of roots, stems, or rhizomes that shall be removed intact.
Figure 8:
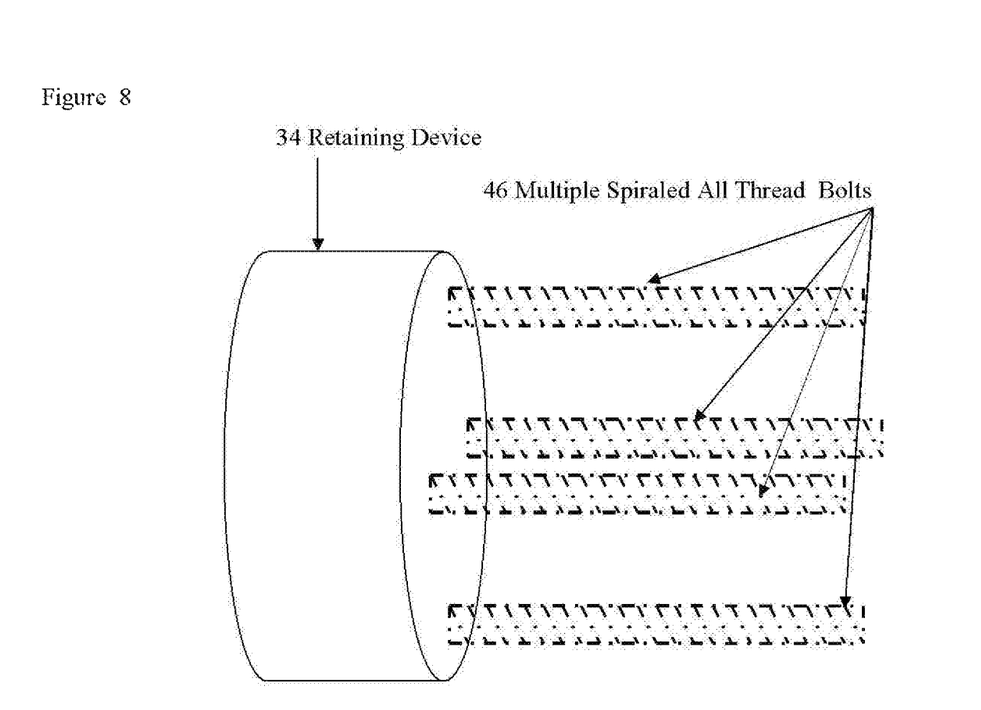
FIG. 8 is a side angle view of the retaining device and the multiple spiraled all thread bolts.
Figure 9:
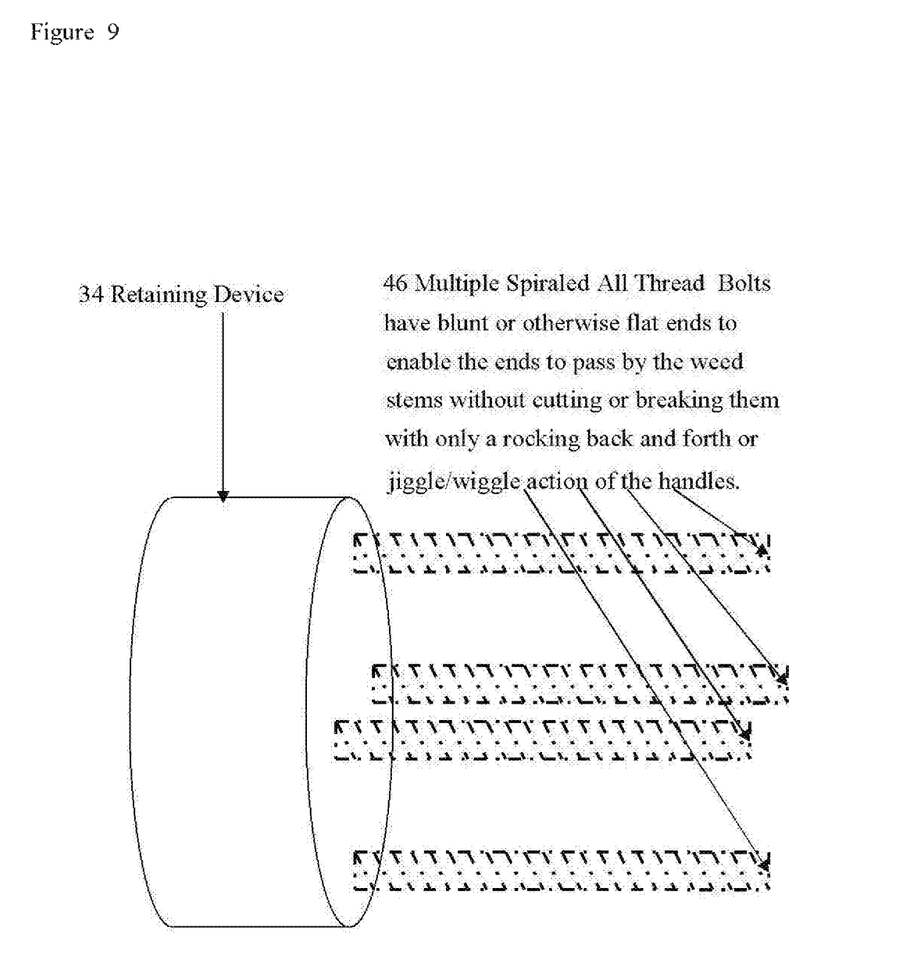
FIG. 9 is a side angle view of the retaining device and the multiple spiraled all thread bolts describing the blunt or otherwise flat ends of the bolts to allow their ends to slide off the stems without cutting or breaking of the weed stems.

Referring to the Figures, wherein like numerals indicate like or corresponding parts throughout the several views, an exemplary "dallisgrassweeder a weed surgeon" is generally shown as 10. For purposes of illustration and not to be in any way limiting, the following description to 12 Ejector Knob or 14 Ejector Spring and so on. However it would be appreciated that the invention is equally applicable to any and all other parts comprising 10 "dallisgrassweeder a weed surgeon" as the same becomes better understood by reference to the following detailed description when considered in connection with the accompanying drawings, wherein:

The subject invention 10 "dallisgrassweeder a weed surgeon", a tool, that surgically removes weeds, including the rhizomes, roots, stems, and seed all at one instance leaving an aerated hole ready to receive the desired grass seed and or the use of the "dallisgrassweeder a Weed Surgeon" to insert a plug of grass where the weed was removed from and then add water reviving the lawn in a short period of time.

Center the 34 Retaining Device over the weed center, and with the weight of the 10 "dallisgrassweeder a weed surgeon" only, set the blunt or otherwise flat ended 46 Multiple Spiraled All Thread Bolts to soil by use of a rocking of the handles back and fourth or a jiggle and or wiggle of the 18-22 and 20-24 handles to clear the stems.

Push the 10 "dallisgrassweeder a Weed Surgeon" into the ground and keep it snug to the ground.

Turn the 18-22 and 20-24 handles in a clockwise direction making as many rotations required to horizontally roll up all the weed roots, rhizomes, and stems seeds. One shall know by the feel of the roots when they are wound up.

Each rotation shall spool and wind up some of the length of the weed roots, rhizomes, and stems requiring several revolutions to roll up the entire weed.

Many weeds have long roots and stems that require several revolutions of the 18 First Handle Tube, 22 First Handle Cushion, 20 Second Handle Tube, and 24 Second Handle Cushion to roll them all up.

The windings of the roots and stems increase the holding power of the 34 Retaining Device with 46 Multiple Spiraled All Thread Bolts.

Upon the completion of the rolling up of the weed, extend the tool 10 dallisgrassweeder a weed surgeon down to arms length with one hand then pick it up by the 28 Hollow Shaft with the other hand. Now one shall notice the tight grip attained by the 34 Retaining Device and the 46 Multiple Spiraled All Thread Bolts.

Now move the 34 Retaining Device end to a trash recepticle and then push the built in 12 Ejector Knob to dispose of the weed debris.

Many weeds sometimes will have clusters of weeds looking as one weed however each weed in a cluster has a center. Applying the use of the "dallisgrassweeder a weed surgeon" to each weed center one at a time shall get the same results, surgical removal.

Now place the desired grass seed in the aerated hole left by the weed removal or use the 10 "dallisgrassweeder a weed surgeon" to extract a plug of desired grass from a grass sod patch and it shall be the same size as the hole of the aerated hole made by the weed removed.

Insert the sod grass plug in the hole, then while holding the 12 Ejector Knob with one hand pull up on the 28 Hollow Shaft with the other hand placing the grass plug in the aerated hole for a complete new appearance.

Add water, rain if possible.

I claim:

1. A tool for removing weeds the tool comprising:
   an ejector rod having an ejector knob connected to the top end of the ejector rod with an ejector disc connected to a bottom end of the ejector rod;
   a housing tube having a length with top and bottom ends and the ejector rod extending within the length of the housing tube;
   a support element comprising handles with the support element connected to the top of the housing for handles are used rotate the tool thereby removing the weeds; and
   a retaining device comprising threaded bolts with blunt ends at the bottom of the housing tube wherein the retaining device is further comprising a recess having a bearing ring with the ejector rod which extends in and out of the recess containing the bearing ring and the rod having the ejector disc plate further comprising fasteners on top and bottom of the ejector disc plate with a rubber ring inbetween the ejector disc plate and fasteners.

2. The tool as according to claim 1, wherein the ejector knob is further comprising a spring.

3. The tool as according to claim 1, wherein the handles have cushions and the handles are further comprising threads ends which thread into the support element which is circular.

\* \* \* \* \*